United States Patent [19]

Moberg et al.

[11] Patent Number: 5,490,201
[45] Date of Patent: Feb. 6, 1996

[54] METHOD IN CONJUNCTION WITH UPDATING ONE OR MORE HLR-DATABASES INCLUDED IN A MOBILE TELEPHONE SYSTEM

[75] Inventors: Jörgen Moberg, Stockholm; Jörgen Lantto, Tullinge, both of Sweden

[73] Assignee: Telefonaktiebolaget LM Ericsson, Stockholm, Sweden

[21] Appl. No.: 66,730

[22] Filed: May 26, 1993

[30] Foreign Application Priority Data

Jun. 3, 1992 [SE] Sweden ................................ 9201723

[51] Int. Cl.$^6$ .................................................. H04Q 7/24
[52] U.S. Cl. ............................................. 379/58; 379/60
[58] Field of Search .............................. 379/59, 60, 58; 455/33.1, 56.1

[56] References Cited

U.S. PATENT DOCUMENTS

| | | | |
|---|---|---|---|
| 5,123,111 | 6/1992 | Delory et al. | 455/34.1 |
| 5,210,787 | 5/1993 | Hayes et al. | 379/60 |
| 5,289,179 | 2/1994 | Beeson et al. | 340/826 |

FOREIGN PATENT DOCUMENTS

0438098A1  7/1991  European Pat. Off. .

OTHER PUBLICATIONS

"Recommendation GSM 03.07" ETSI TC GSM, Version 3.2.0, pp. 1–10 (Oct. 1990).
W. Weiss et al., "System 900: The ISDN Approach to Cellular Mobile Radio" Electrical Communication, vol. 63, pp. 400–408 (1989).
Delory, Treillard, "Security and Saturation Solutions for GSM" Telephone Engineer and Management, vol. 9S, 1990.
Goodman, "Trends in Cellular and Cordless Communications" Jun. 1991, IEEE Communications Magazine.
Ericsson Radio System Incorporated, "Advanced Intelligent Networks a Platform for Personal Communications", 1992.

Primary Examiner—Curtis Kuntz
Assistant Examiner—William Cumming
Attorney, Agent, or Firm—Burns, Doane, Swecker & Mathis

[57] ABSTRACT

A method in conjunction with updating one or more HLR-databases included in a GSM-type mobile telephone system. Updating of an HLR is requested by sending a so-called Reset-message, which identifies the HLR-database concerned, to a number of VLR-databases. The losses in process capacity of the VLR-bases will be relatively small, because of the following: The time points at which Reset-messages and the time points at which radio contacts were made with different mobile stations are registered in each VLR. For each radio contact made between a VLR and a mobile station, a search is made in VLR to ascertain whether the mobile station belongs to an HLR which has been requested updating. If such is the case, the time point of the preceding radio contact between VLR and the mobile station is compared in VLR with the time point at which the Reset-message was received, wherein HLR is updated with data from VLR when the preceding radio contact occurred before the Reset-message was received.

2 Claims, 3 Drawing Sheets

METHOD IN CONJUNCTION WITH UPDATING ONE OR MORE HLR-DATABASES INCLUDED IN A MOBILE TELEPHONE SYSTEM

TECHNICAL FIELD BACKGROUND

The present invention relates to a method in conjunction with updating of one or more HLR-databases which are included in a GSM-type mobile telephone system, wherein updating of such a database is requested by transmitting to a number of VLR-databases a special signal which identifies the HLR-database concerned.

A GSM-network includes two types of net databases, HLR (Home Location Register) and VLR (Visitor Location Register). A network will normally include several HLRs and several VLRs. An example of a GSM network is illustrated in FIG. 3.

Among other things, each HLR-database has stored therein all permanent data for those subscribers, i.e. those mobile stations, which belong to this particular HLR. The telephone number of the mobile stations and information concerning additional services which are included in the subscription are examples of such data. The active status of the additional services and information which discloses in which VLR-database a respective mobile station is registered at that particular moment are also stored in HLR. The permanent data stored in HLR is secured by also storing the data in an external medium with the aid of "backup".

Among other things, there is stored in each VLR-database information which discloses the whereabouts of respective mobile stations that are registered in a particular VLR at that particular time. Each VLR also contains a copy of the subset of all subscriber data that is contained in HLR and is relevant to this VLR. This subset is obtained from HLR in conjunction with a new mobile station entering the area covered by a VLR, whereupon data is signalled from HLR to VLR with the aid of CCITT 7-signalling.

The described structure is highly vulnerable to errors and faults in the network, caused for instance by restarts in HLR or VLR and also by signalling associated errors. Consequently, there have been defined within GSM standardized work procedures for restoring data in these so-called node types in the most robust way possible, so as to avoid an error spreading to several nodes and resulting in breakdowns in the network.

When a VLR-database has lost its data for some reason or another, the VLR will update its data autonomously, by signalling backwards and forwards between itself and those mobile stations which are located within the area covered by this particular VLR. This means that those HLR-databases to which the mobile stations belong will not be affected immediately by a restart in a VLR. Data is collected from each individual HLR upon the next radio contact with a mobile station which belongs to this HLR.

On the other hand, if an HLR has been restarted, which means that the data therein may be corrupted, it is necessary for this HLR to request the assistance of different VLR in recreating parts of the data that was stored in HLR. This primarily concerns information as to which VLR mobile stations are registered at that time. According to GSM-standards, this is carried out by the HLR-database concerned informing all VLR-databases that this particular HLR has been restarted and needs to be updated with new data. This is effected with the aid of a "Reset" operation, which is signalled over the CCITT 7-network.

According to GSM-standards, when a "Reset-message" is received, those mobile stations which are registered in this VLR and which, at the same time, belong to the HLR-which needs to be updated are marked in each VLR-database in a special way. This marking is effected by allocating a flag, referred to as a "HLR confirmation flag" to each such mobile station. The intention with this procedure is to update HLR with data from VLR on the next occasion on which VLR has radio contact with a mobile station that has been marked with this flag. In this way, HLR receives information which discloses in which VLR respective mobile stations are registered at that particular time. Certain other data is updated at the same time, although this data is less important than the data which discloses to which VLR the mobile stations belong. It can also be mentioned that when updating HLR, a certain amount of data is transmitted from HLR to VLR, for instance subscriber data which applies to the mobile station.

Known methods for updating VLR-databases and HLR-databases are described in: ETSI TC GSM, Recommendation GSM 03.07, Restoration Procedures, Version: 3.2.0, Date: October 1990.

The known method of updating an HLR-database, however, is difficult to apply in practice, since a Reset-message does not contain information which discloses those mobile stations which belong to the HLR to be updated nor yet those VLR-databases which contain any data whatsoever required for the relevant updating procedure. Consequently, it is necessary to derive such information from the VLR-databases, by searching each and every one of said VLR-databases for the information obtained in conjunction with the entry of different mobile stations into the area covered by this VLR. Accordingly, it is necessary for each individual VLR to search through the whole of its subscriber register in order to find the HLR to which respective mobile stations belong. This search results in process capacity losses on the part of the VLR-databases, and these losses will, of course, be much greater on those occasions when a HLR is restarted several times within a short period of time or when several HLRs are restarted shortly after one another and several Reset-messages are therefore transmitted in sequence. Each VLR will therewith search through its subscriber register for each Reset-message received.

SUMMARY

The object of the present invention is to provide a method of procedure in conjunction with updating one or more HLR-databases, so that the losses in the process capacity of the VLR-databases will be smaller than they would otherwise be when practicing the aforesaid known method. In brief, this is achieved in the following way:

The time points at which Reset-messages are received and also the time points when radio contact is made with different mobile stations are registered in VLR. With each radio contact between a VLR and a mobile station, a search is made in VLR with the intention of learning whether or not the mobile station belongs to a HLR that has requested updating. If such is the case, the time point of the preceding radio contact between VLR and the mobile station is compared in VLR with the time at which the Reset-message was received, wherein HLR is updated with data from VLR when the preceding radio contact took place earlier than the time at which the Reset-message was received.

This obviates the necessity of searching in VLR to establish those mobile stations which are of interest for the updating procedure immediately after receiving the Reset-message. Instead, this search is spread-out over time and is effected for each individual mobile station in conjunction with the next radio contact with said station.

BRIEF DESCRIPTION OF THE DRAWING

The invention will now be described in more detail with reference to the accompanying drawing, in which.

DETAILED DESCRIPTION

Figure 1:
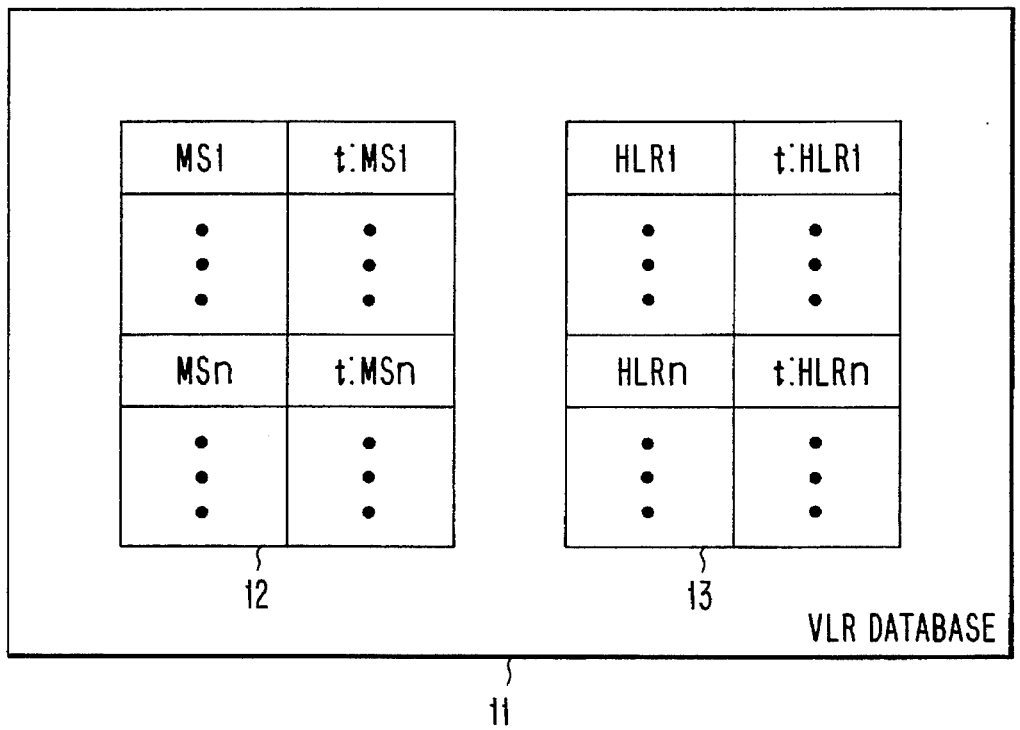
FIG. 1 illustrates two tables which contain certain information which is stored in a VLR-database in accordance with the invention.

FIG. 1 shows two tables, 12 and 13, which are enclosed by a rectangle 11 which represents a VLR-database. The table 12 contains certain subscriber data which is stored in the VLR-database, in accordance with the invention. The time at which a new radio contact occurs between the VLR-database and any mobile station that is located within the area covered by this VLR is registered and stored in VLR. This is symbolized in the Figure by the identity of the mobile station having been written into the left column of table 12, and by the time having been written into the right column of said table. The left column of the table includes the references MS1, ..., MSn, ..., which thus represent the identity of different mobile stations. The right column of the table includes the references t:MS1, ..., t:Msn, ..., which represent the times at which radio contacts were made with the mobile stations in the left column.

Upon renewed radio contact with a mobile station, for instance MS1, the time, t:MS1, is updated in the VLR-database, so that the stored time information will always correspond to the latest radio contact between the VLR-database and the mobile station in question. The times at which any Reset-messages were received and the HLR-databases from which these signals derive are registered and stored in the VLR-database. This has been symbolized in the Figure by writing the identity of the HLR-database into the left column in table 13, and by writing the time points into the right column of the table. The left column of table 13 includes references HLR1, ..., HLRn, ..., which thus represent the identity of different HLR-databases. The right column of table 13 includes references t:HLR1, ..., t:HLRn, ..., which represent the times at which Reset-messages were received from the HLR-databases in the left column. When a new Reset-message is received from a HLR, for instance HLR1, the time point, t:HLR1, is updated so that the time information stored in the VLR-database will always relate to the last received Reset-message from the HLR-database in question.

With each radio contact between a VLR and a mobile station which is located within the area covered by this VLR at that particular time, a search is made in VLR in order to ascertain whether or not the mobile station belongs to a HLR which has requested updating, i.e. belongs to a HLR which has transmitted a Reset-message. If such is the case, the time point stored in VLR, according to table 12, of the preceding registered radio contact between VLR and this mobile station is compared with the stored time point at which the Reset-message was received, in accordance with table 13. When the Reset-message was received at a later time than the time of the earliest preceding radio contact, the HLR-database is updated with data from the VLR-database concerned. In other cases, this updating has already taken place. If, when comparing time points, it is established that no earlier radio contact between VLR and the mobile station concerned has been registered, the HLR-database is updated in the same manner as though a preceding radio contact had been registered at a time earlier than the time of receiving the Reset-message.

Figure 2:
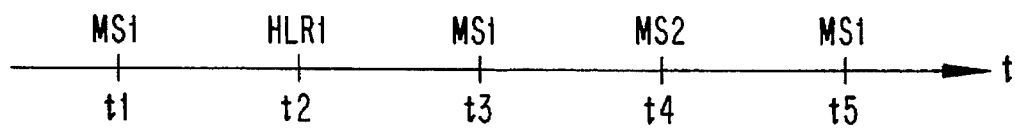
FIG. 2 illustrates an example of a course of events that occur when signalling to and from a VLR-database and FIG. 3 illustrates a GSM radio telephone system.
Figure 3:
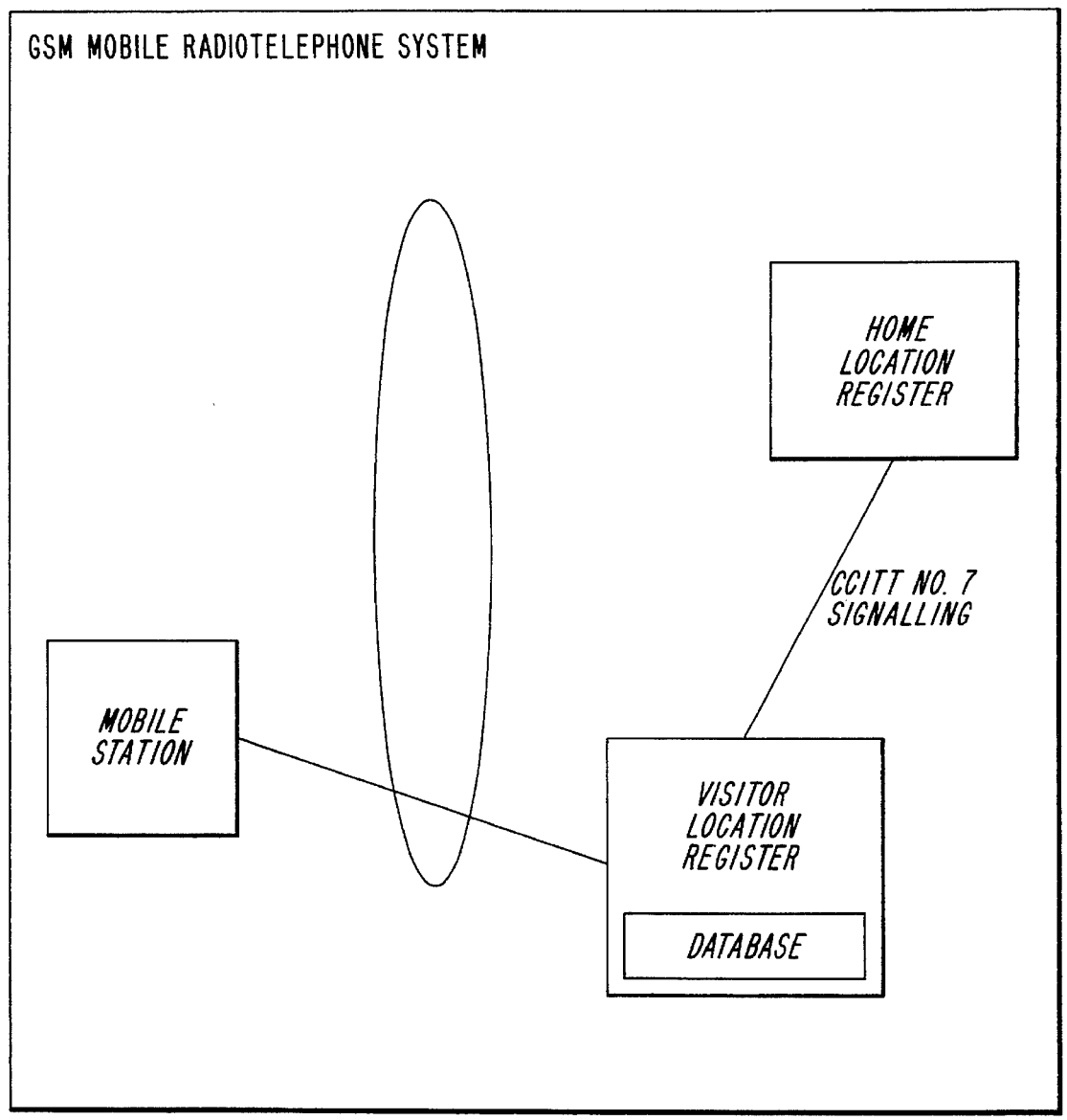
Figure 4:
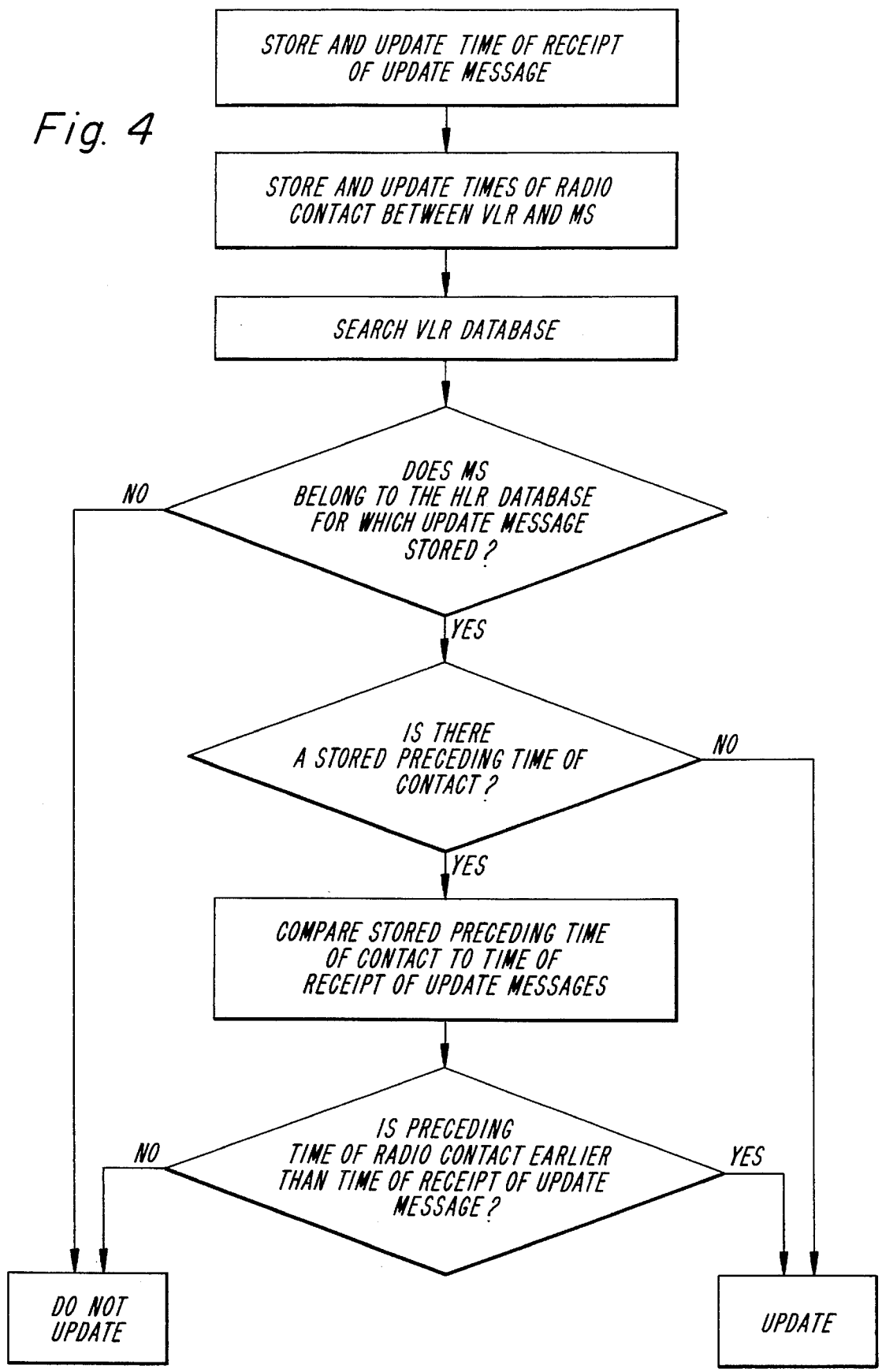
FIG. 4 is a flowchart illustrating a method of updating an HLR database in accordance with the invention.

FIG. 2 illustrates an example of a course of events concerning a reciprocal signalling process, to and from a VLR-database. The Figure includes a time axis on which five time points, t1–t5, have been marked. At time point t1, radio contact takes place between VLR and a mobile station MS1, which is symbolized with the reference sign MS1 above the time axis at time point t1. MS1 is assumed to belong to the HLR-database HLR1. A search is then made in the VLR-database in order to ascertain whether or not a Reset-message has been received from HLR1. In this example, it has been assumed that this is not the case, and HLR1 is therefore not updated. At t2, VLR receives a Reset-message from HLR1, which is symbolized with the reference sign HLR1. At t3, a new radio contact is made between VLR and MS1. A search is again made in VLR, in order to ascertain whether or not a Reset-message has been received from HLR1, which this time is established to be the case. The time point t1 of the earliest preceding radio contact with MS1 is then compared with the time point t2 at which the Reset-message was received. Since t1 is earlier than t2, updating is carried out in this particular case. At t4, a radio contact is made with a mobile station MS2, which is assumed not to belong to a HLR which has requested updating. Consequently, no updating is carried out. At t5, a new radio contact is made with MS1. It is established that a Reset-message has been received from HLR1 at t2 and that the preceding radio contact with MS1 took place at t3, which is later than t2. Consequently, no updating is carried out in this case either. The course of events described above with reference to FIG. 2 is illustrate as a flowchart if FIG. 4.

As before mentioned, the losses in the processor capacity of the VLR-database will be relatively small when practicing the inventive method. This is because the search effected in each individual VLR to establish which mobile stations are of interest with respect to the updating of a HLR-database is spread-out over time, instead of requiring each VLR to search through its subscriber register with each received Reset-message.

What is claimed is:

1. A method of updating a home location register (HLR) database stored in a home location register provided in a mobile radiotelephone system, wherein an update of the HLR database is initiated by transmitting to a visitor location register an update message identifying the HLR database, comprising the steps of:

storing and updating, in a visitor location register (VLR) database stored in the visitor location register, a time of receipt of the update message;

storing and updating, in the VLR database, times of contact between the visitor location register and a mobile station;

searching, at each time of contact between the visitor location register and the mobile station, the VLR database to ascertain whether the mobile station belongs to the HLR database for which an update message has been stored;

comparing, when the mobile station has been ascertained as belonging to the HLR database for which an update message has been stored, a stored preceding time of contact between the visitor location register and the mobile station to the time of receipt of the update message; and updating the HLR database with data stored in the VLR database when the stored preceding time of contact is earlier than the time of receipt of the update message.

2. The method of claim 1, wherein the HLR database is updated when there is no stored preceding time of contact.

* * * * *